V. H. GOTTSCHALK.
OVEN MECHANISM.
APPLICATION FILED JULY 29, 1918.

1,295,478.

Patented Feb. 25, 1919.
2 SHEETS—SHEET 1.

Inventor
Victor H. Gottschalk.
By Robert M. Barr, Attorney

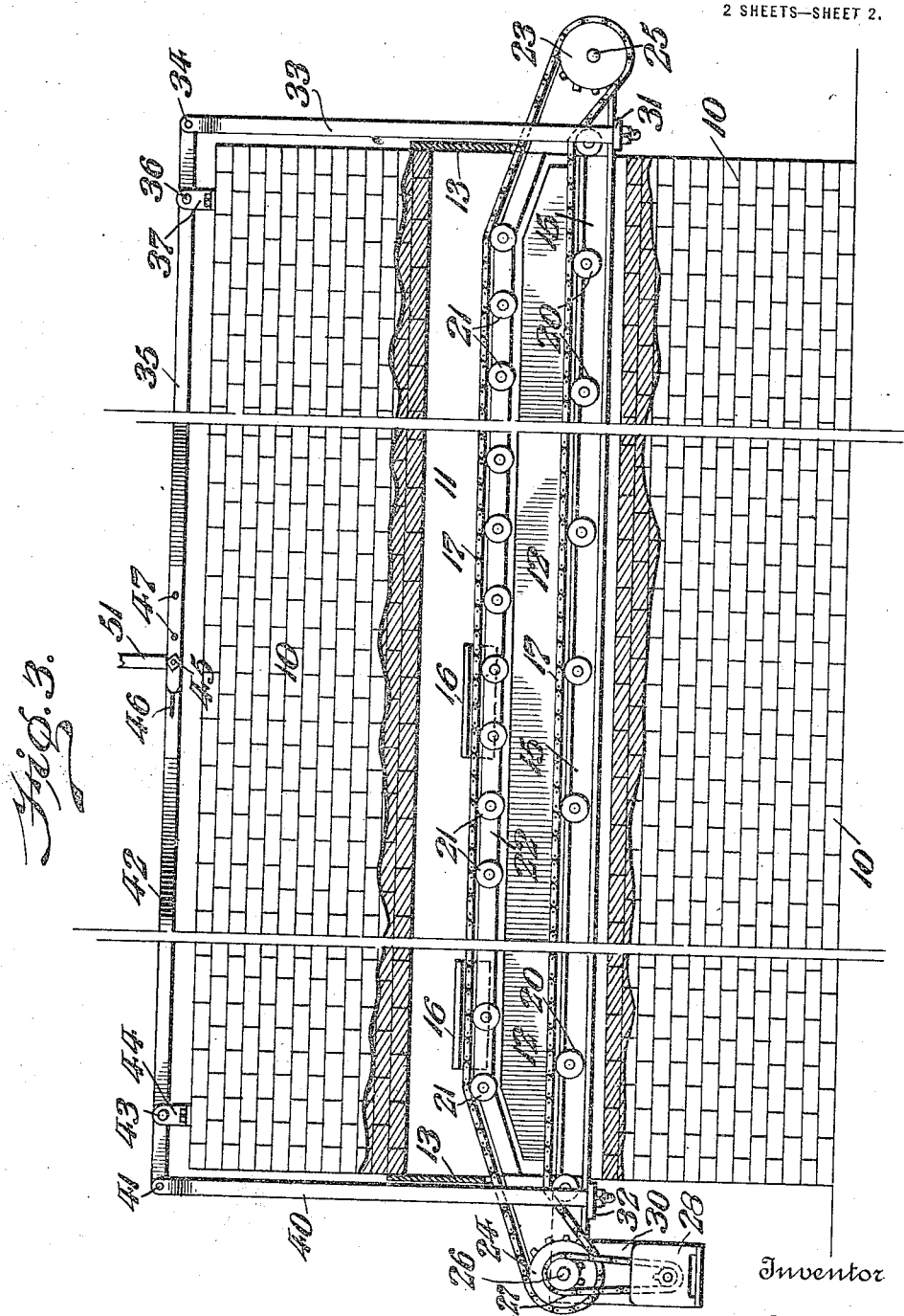

UNITED STATES PATENT OFFICE.

VICTOR H. GOTTSCHALK, OF REEDSVILLE, PENNSYLVANIA, ASSIGNOR TO GOTTSCHALK AUTOMATIC BRICK OVEN CO., OF REEDSVILLE, PENNSYLVANIA, A CORPORATION OF NEW YORK.

OVEN MECHANISM.

1,295,478.  Specification of Letters Patent.  Patented Feb. 25, 1919.

Application filed July 29, 1918. Serial No. 247,309.

*To all whom it may concern:*

Be it known that I, VICTOR H. GOTTSCHALK, citizen of the United States, and a resident of Reedsville, in the county of Mifflin and State of Pennsylvania, have invented a certain new and useful Oven Mechanism, of which the following is a specification.

Some of the objects of the present invention are to provide a raising and lowering mechanism for pans employed in baking ovens; to provide means for elevating a conveyer which carries a plurality of pans, so that the latter are removed from contact with the oven hearth; to provide means for lowering a conveyer which carries a plurality of pans or receptacles so that the latter are brought into contact with the oven hearth; to provide means for counterbalancing the weight of a pan carrying conveyer and its supports; to provide means for automatically removing the baking pans from the hearth at the end of a baking operation; to provide means for weighing the contents of the pans or receptacles when the oven is in operation; to provide means for automatically removing the pans or receptacles from the oven hearth when the contents thereof are of predetermined weight; to provide means for movably supporting a conveyer to insure free unrestricted operation of the conveyer at required times; and to provide other improvements as will hereinafter appear.

Figure 1:
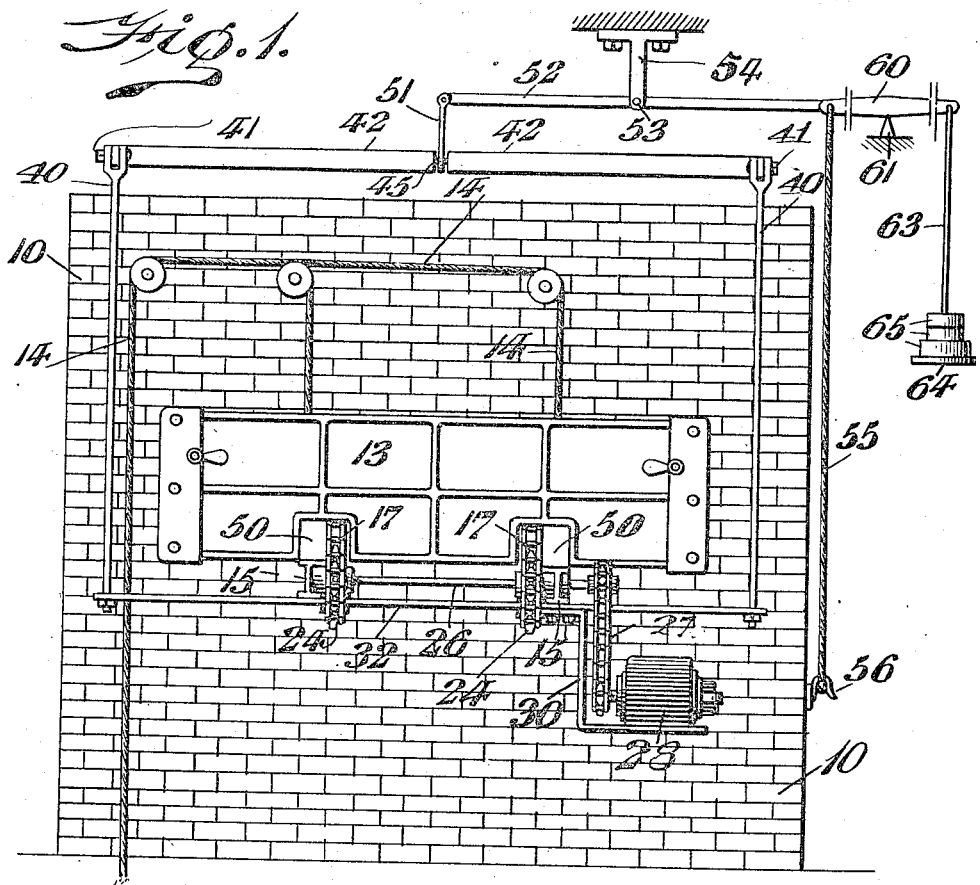
Figure 2:
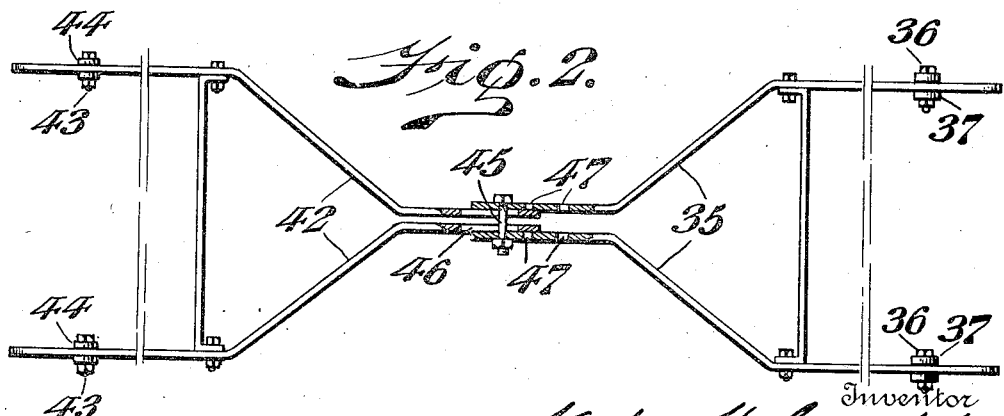

In the accompanying drawings Figure 1 represents a front elevation of an oven embodying one form of the present invention; Fig. 2 represents a plan, partly in section, of the lever operating mechanism; and Fig. 3 represents a side elevation of the oven, partly broken away to show the conveyer mechanism.

Referring to the drawings one form of the present invention is shown wherein the oven is of suitable construction comprising an inclosing wall 10 of brick or other suitable material forming a heating or baking chamber 11 having a customary hearth 12 which is heated by any well known means.

For the purpose of expeditiously filling and emptying the oven, the chamber 11 extends from one end of the inclosing wall to the other, thus forming an uninterrupted passage that is closed at its ends respectively by doors 13 which are preferably of the vertically sliding type and controlled by counterbalanced hoisting and lowering means 14 to facilitate access to the chamber 11.

In order to carry the material into the oven chamber to be heated or baked a pair of freely movable rigid bars 15 are provided, being here shown as I beams, and suitably spaced with respect to each other to form supports for the transversely disposed pans or receptacles 16 in which the material is carried, and which rest upon and move with the conveyer chains or belts 17. The pans 16 are preferably of the type shown in my prior Patent #1,137,711 though any suitable pan may be employed. These conveyers are of the endless type and are respectively supported upon guide rolls 20 journaled upon the bars 15 and guide rolls 21 which are journaled upon frames 22 that are connected to the respective bars 15 in order to move therewith. The conveyer passes around end sprockets 23 and 24, the former being mounted for rotation upon a transverse shaft 25 and the latter fixed to the driven shaft 26 which receives motion through a suitable power transmission 27 operated by a motor 28 or the like. The motor 28 is fixed to a hanger bracket 30 secured to one of the bars 15 and hence moves therewith, as will be explained.

For the purpose of supporting the beams 15 and conveyer mechanism for movement toward and away from the hearth 12, the projecting pairs of the ends of the beams 15 rest respectively upon and are made fast to cross tie bars 31 and 32, which substantially parallel the end walls of the oven below the door openings in order to permit free access to the oven chamber. The tie bar 31 is supported at its ends respectively by hanger rods 33 which are pivoted above the oven top, as indicated at 34, to the projecting ends of a bifurcated lever 35 which has its fulcrum 36 in brackets 37 fixed to the oven and so positioned as to bring the long arm of the lever 35 on the opposite side of the fulcrum from the tie bar support 31. The tie bar 32 is similarly supported by vertical rods 40 pivoted at 41 to a second bifurcated lever 42 having its fulcrum 43 in brackets 44 located to bring the long arm of the lever 42 on the opposite side of the fulcrum 43 from the tie bar 32.

In order to simultaneously move the bars 31 and 32 to raise and lower the beams 15 and the conveyer an equal distance at each end and thus maintain the plane of the supported pans or receptacles, the long arms of the respective levers 35 and 42 are of equal length and the applied force acts at a point common to the two levers. In the present construction a fastening pin 45 adjustably connects the two levers by providing a slot 46 in one lever and a series of openings 47 in the other lever, thus serving to proportion the lever arms in the required manner and as a point of attachment for the operating means. In connection with the raising and lowering of the conveyer and its supports it should be noted that the hearth 12 is provided with longitudinally disposed parallel channels 50, each of which forms a guide for one of the conveyer sides and permits the required movement which is necessary to deposit the pans upon the hearth or raise them above the hearth when the conveyer is to be driven.

For the purpose of raising and lowering the conveyer mechanism to bring the pans into or out of contact with the hearth the pin 45 is pivotally connected to a link 51 which in turn is pivoted to a lever 52 fulcrumed at 53 to a fixed support 54 and having its opposite end freely extended so that if raised the conveyer supports and mechanism will also be raised and if lowered the same parts will be lowered. In this connection it should be noted that preferably the weight and leverage of the long arms of the lever 35 and 42 is such as to overbalance the weight of the conveyer mechanism when empty and consequently in normal position of the parts the conveyers are in raised position. By lowering the free end of the lever 52 either manually by a rope or like device, or automatically, the conveyer mechanism is lowered to bring the pans into contact with the hearth. Thus by attaching a rope 55 or the like to the lever 52 and employing a fastening device 56 on the wall 10 the conveyer position may be manually controlled as desired.

For the purpose of automatically controlling the movement of the conveyer toward or away from the hearth and also for weighing the contents of the pans and giving a predetermined weight to the product a scale beam 60 mounted on suitably fixed knife edges 61 is provided, one end of which is connected by a pivot pin 62 with the free end of the lever 52, while its other end suspends a rod 63 carrying a support 64 for the weights 65, of which a suitable number will be available for the purpose intended. It will be understood that the scale beam here shown is only by way of example and any means may be employed which is capable of delicate balance and adjustment for the purpose intended. Before taking up the operation of the device attention is directed to the fact that the form of the invention here shown is an oven for bakeries having particular reference to bread baking though broadly the invention includes any type of oven wherein it is desired to bake products having a definite predetermined weight after the baking process is completed. Thus in the present form the evaporation of moisture in the dough during baking with the consequent loss in weight is utilized in setting the balancing mechanism and by placing proper known weights on the scale beam definite weight of the product may be automatically obtained.

In the operation of the oven either the rope control 55 is released or enough weights placed on the support 64 to cause the conveyer mechanism to be raised above the plane of the hearth 12 and upon starting the motor 28 the pans 16 may be successively placed upon the conveyer and thereby carried into the oven. When the capacity of the oven is reached the motor 28 is stopped and, assuming the scale beam 60 to be connected, enough weights are placed upon the support to balance the weight of the contents of the pans, it of course being understood that a fixed weight is employed to counterbalance the weight of the movable support, and the conveyer filled with empty pans. Having determined the weight of the batch of dough to be baked enough weights are removed to give the required weight of the baked product whereupon the conveyer is lowered to bring the pans 16 into contact with the hearth 12, the doors are closed and the baking begins. When the baking reaches the point where the product is overbalanced by the adjusted scale beam the conveyer mechanism with its load automatically lifts and may be started to deliver the finished product through the exit opening. That the delicate adjustment of the automatic weighing mechanism may be appreciated it may be stated that the ordinary pound loaf of bread enters the oven as dough weighing two to three ounces over the pound and when properly baked the excess weight is lost by evaporation, so that in the present invention allowance is made for this loss and by proper adjustment a desired predetermined weight may be obtained with great accuracy.

It will further be noted that the overhead four point suspension provides an even, unrestricted rise and fall movement of the conveyer frame and its load. This wear is reduced, binding of one part with respect to another is eliminated and friction reduced to a minimum.

By the present invention the use of the peel is dispensed with since all of the pans are subjected to the same uniform baking temperature, all remain in the oven the same length of time and no inspection is necessary during the baking process. In addition the pans are all stationary during baking and the absence of shifting and moving the pans about promotes uniform texture and quality.

What I claim is:

1. In an oven mechanism, a hearth, means to support a pan in contact with said hearth, and means operative at a predetermined weight of the contents of said pan for moving said pan out of contact with said hearth.

2. In an oven mechanism, a hearth, means to support a plurality of pans in contact with said hearth, and means operative at a predetermined weight of the contents of said pans for moving said pans out of contact with said hearth.

3. In an oven mechanism, a hearth, means to support a plurality of pans, and means automatically operative at a predetermined weight of the contents of said pans for causing relative movement between said pans and said hearth.

4. In an oven mechanism, a hearth, means to support a plurality of pans above said hearth for movement toward or away from said hearth and also parallel thereto, and counterbalancing means for said supporting means.

5. In an oven mechanism, a hearth, means to support a plurality of pans above said hearth, a lever system counterbalanced with respect to the weight of said supporting means, and means suspending said supporting means from said lever system.

6. In an oven mechanism, a hearth, means to support a plurality of pans above said hearth, a lever system counterbalanced with respect to the weight of said supporting means, and means operative automatically at a predetermined time to shift said lever system to raise said supporting means.

7. In an oven mechanism, a hearth, means to support a plurality of pans above said hearth, a lever system counterbalanced with respect to the weight of said supporting means, and means to vary the time of operation of said automatic means at will.

8. In an oven mechanism, a hearth, a pair of levers fulcrumed respectively to form short and long arms, and a support for pans suspended from the short arms of said levers and arranged to position said pans above said hearth, the long arms of said levers forming a counterweight for said support.

9. In an oven mechanism, a hearth, a pair of levers fulcrumed respectively to form short and long arms, a support for pans suspended from the short arms of said levers and arranged to position said pans above said hearth, the long arms of said levers forming a counterweight for said support, and means subject to the weight of the contents of said pan for operating said levers to raise said support.

10. In an oven mechanism, a hearth, a pair of levers fulcrumed respectively to form short and long arms, a support for pans suspended from the short arms of said levers and arranged to position said pans above said hearth, the long arms of said levers forming a counterweight for said support, a scale beam connected at one end to the long arms of both levers, and weights for the other end of said beam to balance the contents of said pans.

11. In an oven mechanism, a hearth, a conveyer arranged to support a pan in contact with said hearth, means operative at a predetermined weight of the contents of said pan for moving said pan out of contact with said hearth, and means to operate said conveyer.

12. In an oven mechanism, a hearth, a conveyer arranged to support a plurality of pans in contact with said hearth, means operative at a predetermined weight of the contents of said pans for moving said pans out of contact with said hearth, and means to operate said conveyer.

In testimony whereof, I have hereunto signed my name.

VICTOR H. GOTTSCHALK.

Copies of this patent may be obtained for five cents each, by addressing the "Commissioner of Patents, Washington, D. C."